US006423169B1

(12) United States Patent
Cobb

(10) Patent No.: US 6,423,169 B1
(45) Date of Patent: Jul. 23, 2002

(54) SUBLIMATION HEAT TRANSFER SYSTEM AND RELATED METHOD

(75) Inventor: Dwayne A. Cobb, Versailles, KY (US)

(73) Assignee: Hunter Manufacturing Group, Inc., Lexington, KY (US)

( * ) Notice: Subject to any disclaimer, the term of this patent is extended or adjusted under 35 U.S.C. 154(b) by 0 days.

(21) Appl. No.: 09/521,823

(22) Filed: Mar. 9, 2000

(51) Int. Cl.[7] .......................... B44C 1/165; B32B 31/00

(52) U.S. Cl. ....................... 156/230; 156/241; 156/540; 156/581; 156/DIG. 9; 156/DIG. 12

(58) Field of Search ...................... 156/DIG. 8, DIG. 9, 156/DIG. 12, DIG. 13, DIG. 18, DIG. 27, DIG. 33, DIG. 36, DIG. 43, 538, 539, 540, 541, 542, 230, 234, 238, 240, 241, 277, 499, 380.9, 384, 344, 228, 580, 581, 582, 273.7, 303.1

(56) References Cited

U.S. PATENT DOCUMENTS 4,842,613 A 6/1989 Purser
4,844,770 A 7/1989 Shiraishi et al.
4,874,454 A 10/1989 Talalay et al.
4,943,684 A 7/1990 Kramer
5,121,827 A * 6/1992 Ribordy ...................... 198/377
5,156,711 A * 10/1992 Schwyn ...................... 156/379

* cited by examiner

*Primary Examiner*—Richard Crispino
*Assistant Examiner*—Kevin P Shortsle
(74) *Attorney, Agent, or Firm*—King and Schickli, PLLC

(57) ABSTRACT

A sublimation heat transfer system and related method for transferring a pattern of sublimating ink from a transfer sheet to a coating on an article includes a carousel for moving the article and transfer sheet in an endless path through loading/unloading portions and through a transfer portion. A plurality of plungers and fixtures are attached to the carousel for receiving multiple articles and transfer sheets in a continuous fashion. An actuator acts to extend the plungers along the loading portion for forcing the transfer sheets firmly against the coatings of the articles throughout the transfer portion and to retract the plungers along the unloading portion for removal and separation of the printed articles and the spent transfer sheets. A driver imparts motion to the carousel. A heater in the form of an oven enclosing the carousel activates the coating on the article and the ink.

21 Claims, 3 Drawing Sheets

SUBLIMATION HEAT TRANSFER SYSTEM AND RELATED METHOD

TECHNICAL FIELD

The present invention relates to the field of sublimation heat transfer systems, and more particularly to a carousel type system for, and to a related method of, transferring patterns to coatings on articles in an efficient and continuous fashion.

BACKGROUND OF THE INVENTION

Over the past several years the process of printing by sublimation, that is transforming a solid directly to a vapor, has been used to transfer decorative patterns/images to articles. In this process, sublimable inks/dyes are printed on a transfer sheet and transferred to the articles upon the application of heat and pressure. The transfer sheet is placed in direct contact with a coating on the article that is capable of receiving and retaining the pattern. When heated to a temperature at least as high as the sublimation temperature of the selected inks constituting the pattern, vaporization of the inks/pattern occurs, allowing their absorption into the coating.

Since all substances in vapor form tend to expand, a true-pattern transfer can be achieved only if the sublimated inks/patterns are captured by the heated coating instantly upon vaporization. Accordingly, steady contact between the pattern/transfer sheet and the coating/article under a constant pressure is essential for a superior quality transfer. In addition, both pressure and temperature must be uniformly distributed over the transfer surface in order to avoid blurring and distortion of the transferred pattern. Thus, the elimination of hot or cold spots and/or non-uniform contact between the pattern/transfer sheet and the coating/article is paramount.

Execution of these basic concepts have alluded the industry in the past. While there has been varying degrees of success with several single application sublimation transfer machines since the late 1980's, much is left to be desired. For example, U.S. Pat No. 4,874,454 to Talalay et al. discloses a sublimation transfer machine that utilizes a flexible heating pad that is pressed against the curved surface of a mug by an enveloping tensioning belt. Although effective in transferring the printed pattern onto the mug, the utilization of the heating pad can result in some blurring or distorting of the transferred pattern. It is believed that this problem results from hot or cold spots and/or induced sliding movement of the transfer sheet caused by the non-uniform contact between the pattern and the mug. In addition, only one article at a time may be printed.

Similarly, the device of U.S. Pat No. 4,943,684 to Kramer suffers the same shortcoming in that it is limited to a single application sublimation transfer, and it has two levered elements and corresponding heating pads which encase an article that are hard to stabilize. During the sublimation process the transfer sheet is prone to shift slightly so as to destroy the sharpness of the image.

Thus, an important aspect of the effort to improve this technology, is to provide a sublimation heat transfer system and related method capable of transferring patterns from transfer sheets to coatings on articles in a more efficient manner, while providing an emphasis on improving the quality of printed image. One aspect of improving the efficiency would be to utilize a plurality of fixtures for receiving the articles and transfer sheets to make the process continuous. Cooperating extendable plungers should be used for engaging and uniformly forcing the articles against the transfer sheets in a repeatable and consistent manner in terms of both pressure and temperature.

Additionally, the transfer system should include the loading/unloading of articles in an easy manner, and by operating in a continuous manner with the minimum of operator involvement. As a result, overall increased operating efficiency is accomplished while significantly reducing, if not eliminating, the occurrence of blurred or distorted printed articles.

SUMMARY OF THE INVENTION

Accordingly, it is a primary object of the present invention to provide a novel and improved sublimation heat transfer system and related method that are particularly adapted to provide improved operating efficiency, in order to overcome the limitations of the prior art.

Another object of the present invention is to provide a sublimation heat transfer system that is particularly adapted for transferring patterns to multiple articles in a continuous fashion.

It is yet another object of the present invention to provide a sublimation heat transfer system having a carousel for moving an article and a transfer sheet in an endless path through loading/unloading portions, and through a transfer portion where heat is applied.

Still another object of the present invention is to provide a novel and improved method of transferring a pattern from a transfer sheet to a coating on an article moving around a carousel of a sublimation heat transfer system.

Yet another object of the present invention is to provide a sublimation heat transfer system which utilizes a plurality of fixtures and plungers attached to a carousel for transferring patterns to multiple articles in a continuous fashion.

Additional objects, advantages, and other novel features of the invention will be set forth in part in the description that follows and in part will become apparent to those skilled in the art upon examination of the following or may be learned with the practice of the invention. The objects and advantages of the invention may be realized and attained by means of the instrumentalities and combinations particularly pointed out in the appended claims.

To achieve the foregoing and other objects of the present invention as described herein, an improved sublimation heat transfer system is provided for transferring patterns from transfer sheets to coatings on one or more articles. More specifically, the sublimation heat transfer system includes a carousel for moving each article and transfer sheet in an endless path through loading/unloading portions, and through a transfer portion within an oven for heating.

A driver for the carousel imparts smooth motion to the carousel and the attached fixtures and plungers, which are arranged in groups around the periphery. The oven surrounding the carousel provides the even heat to activate the coating on the article and the ink on the transfer sheet to cause the controlled sublimation desired. As a result, the process operates in a highly efficient manner, and advantageously generates superior and sharper images on the articles.

An actuator acts to extend the plungers along the loading portion of the endless path for forcing the transfer sheets firmly against the coatings of the articles throughout the transfer portion. In accordance with an important aspect of the present intention, the transfer portion is extended a distance and the speed of the carousel is regulated to maintain the heat for a sufficient time to effect the transfer. The actuator further acts to retract the plungers along the unloading portion of the endless path for removal of the printed articles and the spent transfer sheets.

In the most preferred embodiment, the actuator for the plunger is a cam along the lower part of the oven that contacts and extends the plunger along the loading portion of the carousel's endless path. More specifically, self-aligning cam followers are attached to the plungers for contacting the cam along the loading/unloading portions. The angled mounting of the followers prevents binding of the support spindle for the plunger. Throughout the transfer portion during passage through the oven, the cam follower rides atop the cam thereby maintaining the force applied to the transfer sheets against the coatings of the articles in a consistent manner. Advantageously, in this manner both pressure and temperature are uniformly applied to the transfer sheet and articles, thus avoiding blurring or distorting of the transferred images. It has been found that hot or cold spots and non-uniform pressure between the transfer sheets and the articles is effectively eliminated.

Additionally, the fixtures are formed of metal to form an efficient heat sink in order to assist in the uniform distribution of thermal energy to the articles/coatings during movement along the transfer portion of the endless path. Preferably, the fixtures include a low-friction insert for receiving the articles and the transfer sheets and for pressing the transfer sheets against the coatings of the articles upon full extension of the plungers. A resilient backing is further included for cushioning the articles and transfer sheets. Advantageously, the natural resiliency of the insert and backing provide compensation for any irregularities, including such things as minor misalignments of the plungers/fixtures or the size of the articles relative the fixtures.

In one of the most preferred embodiments, an ejection pin is provided in association with the fixtures to automatically eject the printed articles from the fixtures along the unloading portion of the endless path. Specifically, a second cam along the upper part of the oven along the path extends an ejection pin associated with each fixture for ejecting the printed articles and the spent transfer sheet. In this manner, the printed articles are smoothly transitioned from the fixtures onto the plungers for removal by the operator just as the plunger is lowered. A spring acts to retract the pin as the upper cam is cleared in readiness for the next cycle. The printed articles are thus gently freed from the fixtures and subsequently lowered by the plungers for removal along the unloading portion of the endless path.

In a further aspect of the present invention, in accordance with its objects and purposes, a method of transferring patterns from transfer sheets to coatings on articles moving around a carousel of a sublimation heat transfer system includes positioning fixtures and cooperating plungers for receiving the articles and the transfer sheets on the carousel, driving the carousel in an endless path including loading/unloading and transfer portions loading the articles/sheets on the plungers one at a time, extending the plungers in sequence on the carousel for engaging the articles and the transfer sheets with the fixtures, and activating the coatings on the articles for receipt of the sublimed pattern through heating while moving the articles along the transfer portion of the path, and retracting the plungers for unloading the articles along the unloading portion.

The present preferred method also includes extending the plungers by contacting a lower cam through a cam follower attached to each plunger. The preferred method further includes the steps of receiving and cushioning the articles and the transfer sheets within the fixtures, and pressing the transfer sheets against the articles with the requisite pressure inserts upon full extension of the plungers throughout the transfer portion.

Following the transfer portion of the endless path, the lower cam releases the cam follower allowing the plunger to rescind from its holding position within the fixtures. At approximately the same time, ejecting the printed article is carried out by the upper cam engaging the corresponding ejection pin. In this manner, the printed articles are smoothly transitioned from the fixtures onto the plungers for removal by the operator. As each plunger is unloaded in sequence, the operator reloads with a new article surrounded by the transfer sheet to repeat the cycle in a continuous fashion.

Still other objects of the present invention will become readily apparent to those skilled in this art from the following description wherein there is shown and described a preferred embodiment of this invention, simply by way of illustration of one of the modes best suited to carry out the invention. As it will be realized, the invention is capable of other different embodiments, and its several details are capable of modifications in various, obvious aspects all without departing from the invention. In one modification, the fixture can take the form of a spring metal C-clamp that serves as the fixture. In this instance, the support spindle for the plunger moves upwardly against the free flange of the clamp to provide the pressure of the transfer sheet against the article. Accordingly, the drawings and descriptions will be regarded as illustrative in nature and not as restrictive.

BRIEF DESCRIPTION OF THE DRAWINGS

The accompanying drawings incorporated in and forming a part of the specification, illustrate several aspects of the present invention, and together with the description serve to explain the principles of the invention. In the drawings.

Reference will now be made in detail to the present preferred embodiment of the invention, an example of which is illustrated in the accompanying drawings.

DETAILED DESCRIPTION OF THE PREFERRED EMBODIMENT

Figure 1:
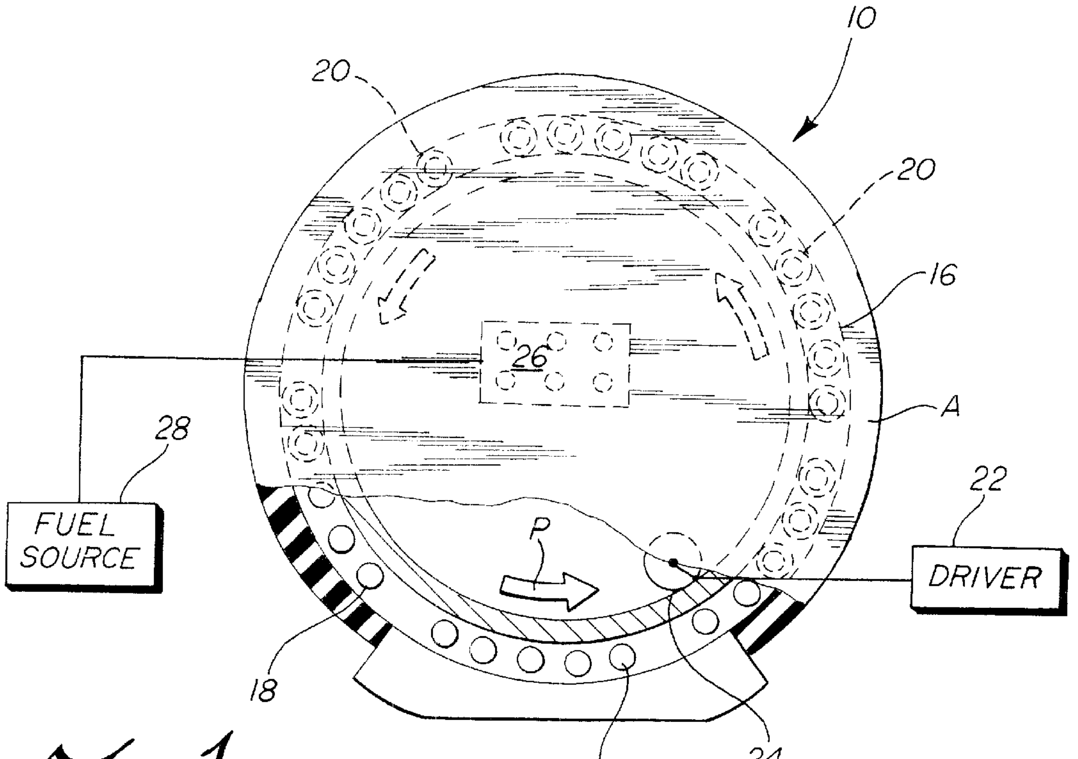
FIG. 1 is a top view of the sublimation heat transfer system including a partial cut-away view of the oven revealing a partial cross-section of the carousel extending through the loading and unloading portions of the carousel path.
Figures 2, 2A:
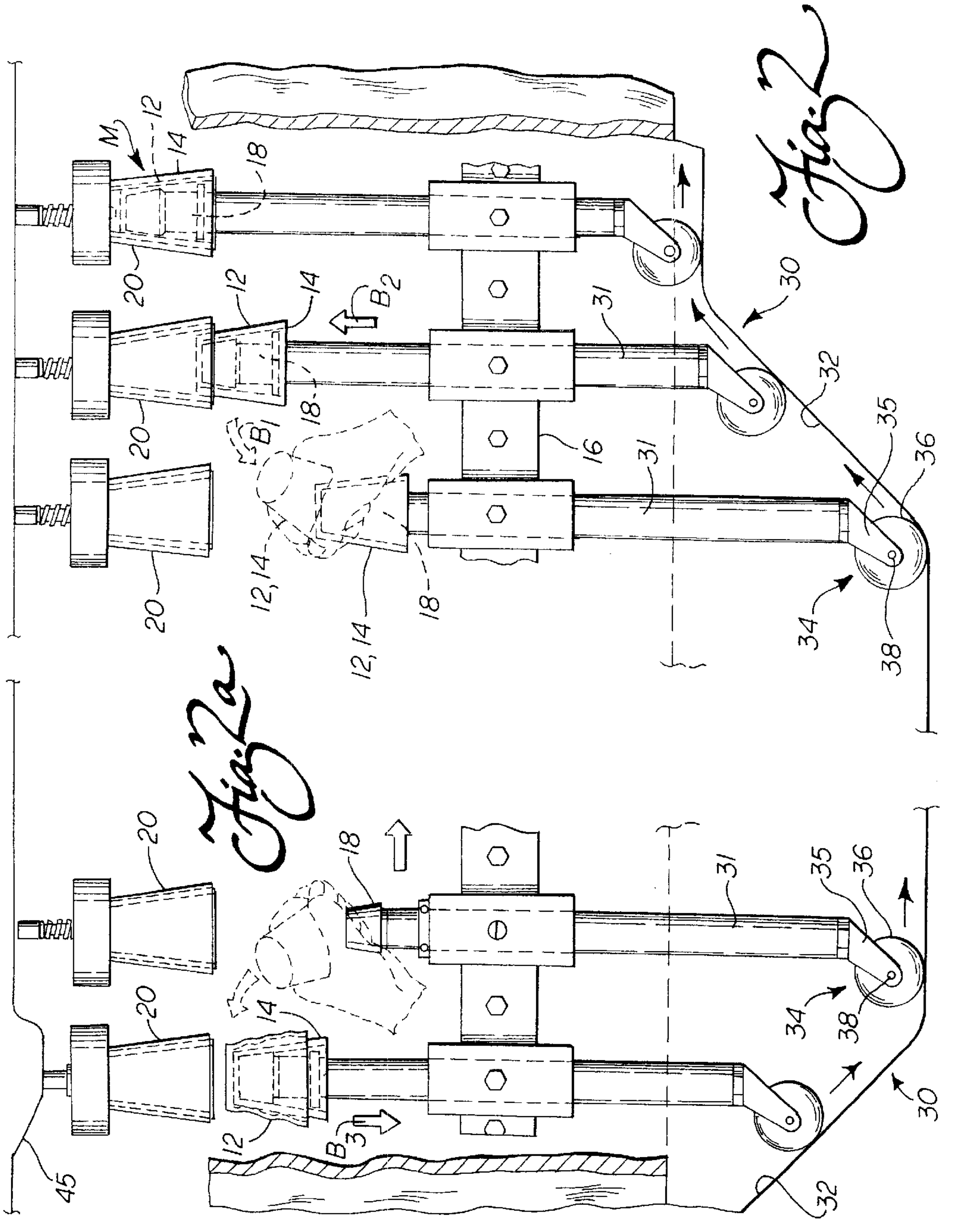
FIGS. 2 and 2*a* are elevational side views of the loading/unloading portions of the system illustrating the sequential retraction of the plungers and removal of a printed article and the spent transfer sheet along the unloading portion of the endless path, the placement of another article and transfer sheet onto a downstream plunger as the plunger is raised along the loading portion, and finally the extension of next-in-line plunger forcing an article and transfer sheet against the fixture as it moves into the transfer portion of the endless path.

With reference to FIGS. 1 and 2, there is shown a preferred embodiment of a sublimation heat transfer system 10 for transferring a pattern from a transfer sheet 12 to a coating on an article 14. In one important aspect of the present invention, the transfer system 10 includes a carousel 16 for moving the article 14 and the transfer sheet 12 in an endless path P (see arrows) through an insulated oven A. In accordance with the broadest aspects of the present invention, the endless path P can form any circular or polygonal shape. Loading and unloading portions along the path are formed at the front of the oven A. A transfer portion extending through the oven forms the remainder of the path. The transfer portion is sufficiently long relative to the speed of the carousel to effect the transfer of the pattern from the transfer sheet 12 to the coating of the article 14.

Figure 3B:
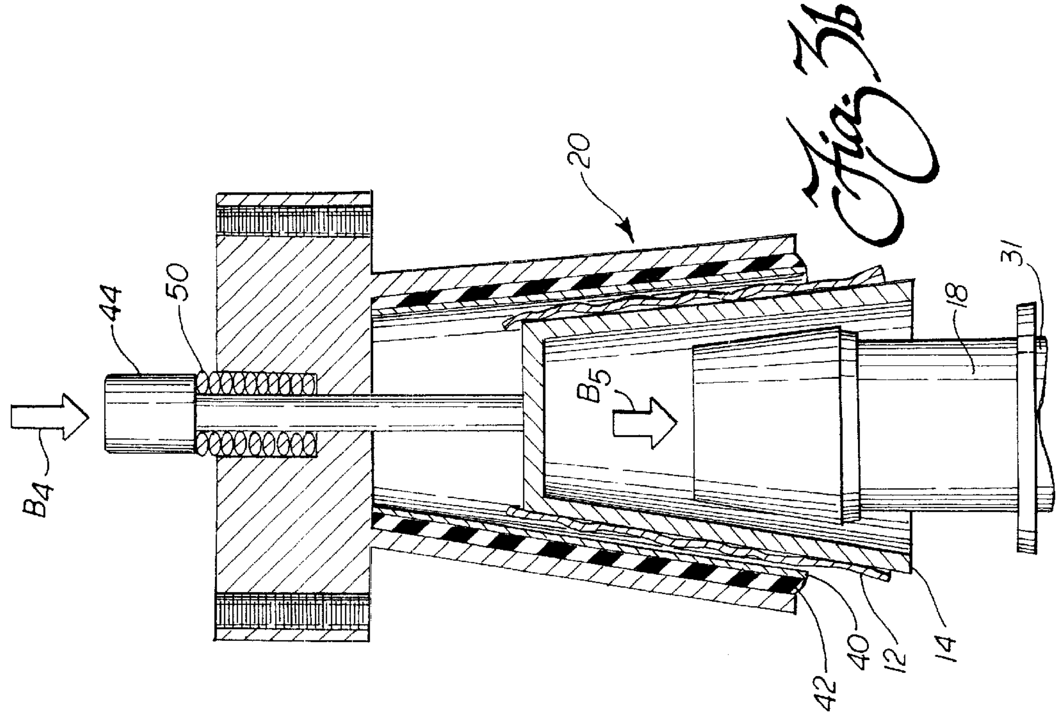
FIG. 3*b* is a similar enlarged cross sectional view of the ejection pin extended into the fixture for ejecting a printed article and residual transfer sheet from the fixture onto a plunger for lowering and removal along the unloading portion of the endless path.
Figure 3A:
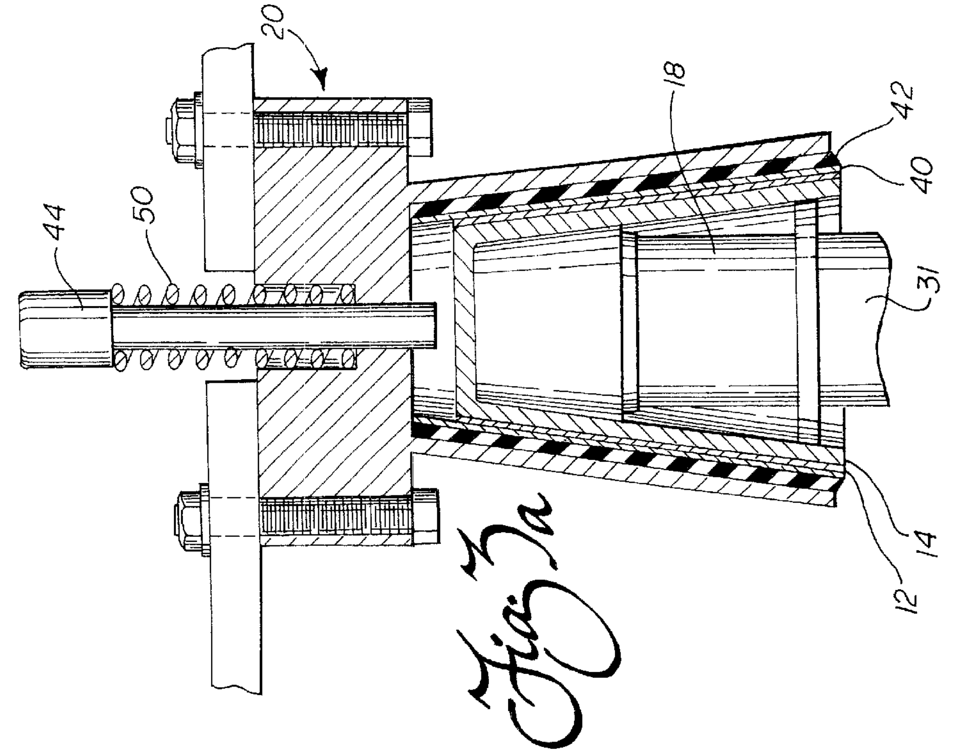
FIG. 3*a* is an enlarged cross sectional view of a fixture supported on the frame of the carousel and a fully engaged article and transfer sheet being pressed into said fixture upon full upward extension of a plunger.

In the preferred embodiment as shown in FIGS. 1 and 3*a,* a plurality of plungers 18 and corresponding fixtures 20 are positioned around the carousel 16 for receiving multiple articles 14 and transferring multiple patterns to the articles 14 in a continuous fashion. More specifically, the plungers 18 and fixtures 20 are attached to the carousel 12 in small groups, preferably in groups of five. In this manner, the manual loading and unloading of the articles 14 and transfer sheets 12 is accomplished in an efficient manner by the operator and without interrupting the continuous movement of the carousel 12.

A driver 22 provides the driving force to impart motion to the carousel 16. The suitable driver may include a motor and shaft, and suitable gear or chain drive 24. In accordance with the broadest aspects of the present invention, other motor, drive shaft, and gear/chain drive combinations meeting this basic criteria can be used.

A heater 26, such as a gas burner is positioned in the oven A generally in the center of the carousel 16, also shown in FIG. 1. The heater is designed to provide a sufficient amount of thermal energy or heat through the carousel 16 to the fixtures 20 to effect the sublimation of the patterns by activation of the coatings on the articles 14 and the inks on the transfer sheets during movement along the transfer portion of the endless path. The present preferred heater 26 is a gas heater having an external fuel supply 28, although any heater capable of providing a sufficient amount of heat may be used in accordance with the broadest aspects of the present invention.

As shown generally by action arrow $B_1$ in FIG. 2, the article 14, and corresponding transfer sheet 12 that is wrapped around it, is manually placed on the upstream plunger 18 during travel along the loading portion of the path P. As each plunger 18 continues along the loading portion or zone, the loaded plunger 18 is lifted (shown by action arrow $B_2$) until the transfer sheet 12 is forced firmly against the coatings of the article 14 within its fixture 20. In accordance with an important aspect of the present invention, the transfer sheets 12 and articles 14 are precisely maintained in this pressure position, generally designated by indicia M, by the fully extended plungers 18 throughout the transfer process along the transfer portion of the endless path.

In the present preferred embodiment of the invention, an actuator 30 comprises a support spindle 31 for the plunger 18 and a cam 32. The plunger 18 engages along the loading portion and retracts (shown by action arrow $B_3$ in FIG. 2*a*) along the unloading portion. Self-aligning cam followers, generally designated numeral 34, are attached by angled carriers 35 to each spindle 31 of the plungers 18. The preferred self-aligning cam follower 34 includes a wheel 36 on the carrier 35, which is pivotally attached to and angled to trail behind the moving plunger 18. Advantageously, angling the carrier 35 significantly reduces the potential for binding upon initial contact between the roller 36 and the cam 32 along the loading portion, which could result in operating stoppages and ultimately lower the operating efficiency. Specifically, the pivoting attachment of the carrier 35 is designed to negate the effect of rotation of the plunger 18 which can occur during loading and unloading.

Throughout the transfer portion, each wheel 36 of the cam followers 34 rides along the raised surface of the cam 32 keeping its plunger 18 fully extended. This results in a constant force being applied to the transfer sheets 12 against the coating on the article 14 in the fixture 20. More specifically, the cam followers 34 are designed to allow the plungers 18 to traverse the circular path of the carousel 16 while fully extended in a smooth manner. Advantageously, this ensures that the transfer sheets 12 are maintained firmly against the coatings of the articles 14 throughout the transfer process. In this manner both pressure and thermal energy are uniformly applied to the transfer sheet 12 and the article 14 providing a superior quality printed article devoid blurring or distorting. As desired, hot or cold spots, or non-uniform contact between transfer sheets and articles are eliminated to provide a transferred image that exhibits sharpness and clarity not heretofore possible, especially in a continuous, multi-article sublimation heat transfer arrangement.

To further assist in the uniform distribution of heat along the transfer portion of the endless path, the fixtures 20 are formed of metal to form a heat sink. As best shown in FIG. 3*a,* the present preferred fixtures 20 are machined from a metal, such as brass, to include a tapered receiver. A low-friction insert 40 is positioned within each fixture 20 for guiding and firmly contacting the article 14 and the transfer sheet 12. The insert 40 is preferably made from a low-friction plastic material, such as materials made under the trademark TEFLON. The fixture 20 further includes a resilient backing 42 preferably made of a rubber material for cushioning of the article and transfer sheet within the fixture. The pliable nature of the insert 40 and the natural resiliency of the rubber backing 42 provides an additional factor ensuring the uniform application of pressure to the transfer sheet 12 and article 14. In addition, the rubber backing 42 provides some compensation for any irregularities in the transfer system 10, such as minor misalignments of the plunger 18 and the cooperating fixture 20, or size variations of the articles 14.

As best shown in FIG. 3*b,* each fixture 20 has an ejection pin 44 for ejecting the printed article 46 and the spent transfer sheet. An actuator, preferably an upper or overhead cam 45, contacts and extends the ejection pins 44 (shown by action arrow $B_4$). The ejection occurs within the unloading portion of the endless path (see FIG. 2*a*). In this manner, the printed or decorated article 14 and the spent transfer sheet 12 is smoothly transitioned from each fixture 20 to rest on the plunger 18 for removal by the operator. A compression spring 50 provides a resistive force against the cammed downward movement of each ejection pin 44 for retracting the same in preparation for receiving the next article 14 and transfer sheet 12 along the loading portion (see FIG. 2).

As shown in FIG. 3*b,* the extension of the ejection pins 44 by cam 45 occurs in cooperation with the retraction of the plungers 18 (shown by action arrows $B_4$ and $B_5$). The retraction of the plunger 18 is initiated first creating a small gap to allow for the start of downward movement. This is closely followed by the extension of the ejection pin 44 and full ejection of the article 14 to rest on the head of the plunger 18 (see FIG. 2*a*). In this manner, the printed article 14 is gently freed from the fixture 20. Once clear of the lower portion of the fixture 20, the printed article 14 and spent transfer sheet 12 is removed and separated to complete the operation.

Figure 4:
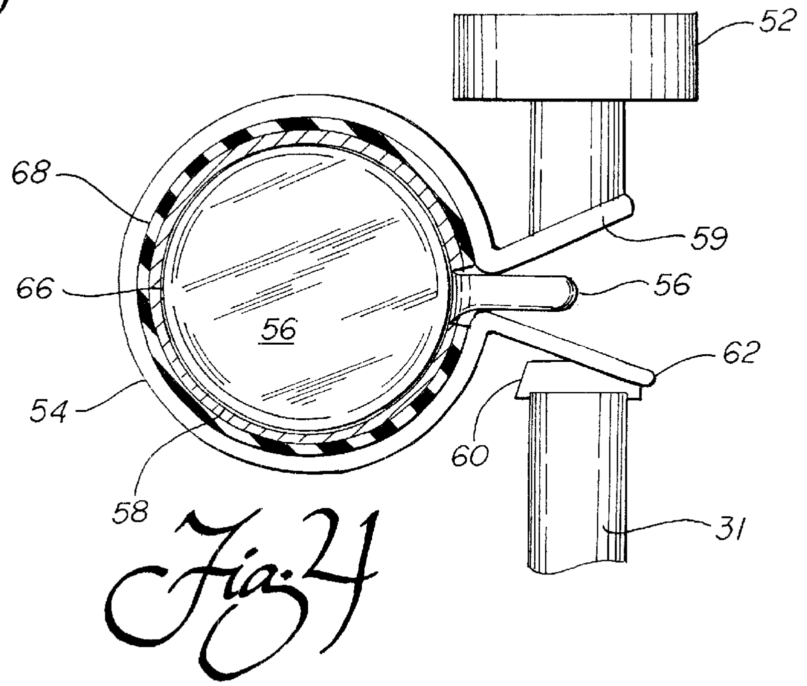
FIG. 4 is a partial elevational side view representative of an alternative system that utilizes a C-shaped clamp fixture carried on the carousel.

In an alternate embodiment of the present invention shown in FIG. 4, a special, resilient C-shaped clamp fixture 54 replaces the fixture 20. It is adapted to be attached by one flange 59 to the carousel 16 and receive a circularly shaped article 56, such as a ceramic mug, and a wrapped transfer sheet 58. As the fixture moves along the loading portion of the endless path, the spindle 31 with a special plunger head 60 contacts a free flange 62 of the fixture 54. As the spindle 31 reaches full extension (shown in FIG. 4), the fixture 54 firmly forces the transfer sheet 58 against the article 56.

In accordance with an important aspect of the present invention, the article 56 and transfer sheet 58 are precisely maintained in this position by the fully extended spindle 31 along the transfer portion of the path in much the same manner as described above for article 14. The alternate fixture 54 is formed of spring metal to form a heat sink and to open by itself once the pressure of the spindle 31 is released.

The fixture 54 further includes a low-friction insert 66 for receiving the article 56 and the transfer sheet 58, and a resilient rubber backing 68 for cushioning. Just as described in detail above, the insert 66 and resilient backing 68 provide firm support ensuring the uniform application of pressure and heat to the article 56 and the transfer sheet 58.

In accordance with the method of the present invention, a plurality of fixtures 20 are positioned around a carousel 16 defining an endless path P. In the present preferred method, the articles 14 (or 56) and transfer sheets 12 (or 58) are manually loaded one at a time as each spindle 31 appears along the loading portion of the endless path. A description of the first embodiment having the fixture 20, as set forth below, suffices to also understand the comparable operation of the alternative embodiment with the fixture 54 of FIG. 4.

Thus, as each plunger 18 including the spindle 31 approaches the transfer portion of the carousel path, the cam 32 extends the spindle 31 and each article 14 with its transfer sheet 12 in turn moves into its fixture 20.

The endless path P is sufficiently long relative to the speed of the carousel 16 to activate the coating on the article and the ink on the transfer sheet 12 to effect the transfer of the pattern.

Following the transfer portion of the endless path P, the plunger 18 retracts from its holding position within the fixture. During the retraction, the further step of ejecting the printed article 14 is accomplished with the assistance of the ejection pin 44. Specifically, an upper cam 45 extends the ejection pin along the unloading portion of the endless path P (see FIG. 3*b*).

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best application to thereby enable one of ordinary skill in the art to utilize the invention in its various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A sublimation heat transfer system for transferring a pattern of sublimating ink from a transfer sheet to a coating on an article comprising:

a carousel for moving the article and the transfer sheet in an endless path through a loading/unloading portions and transfer portion;

a driver to impart motion to said carousel;

at least one plunger attached to said carousel;

at least one fixture attached to said carousel for receiving the article and the transfer sheet;

an actuator for extending said at least one plunger along said loading portion for forcing said transfer sheet against said coating on the article in said fixture; said actuator being operative for retracting said plunger following the transfer portion for removal of the article along the unloading portion; and a heater to activate the coating of the article and the ink on the sheet for transfer within the transfer portion of the endless path, whereby said heat transfer system operates in an endless fashion on a carousel with the attached fixture and plunger moving along said path so as to enhance the transfer of the pattern into a sharp image on the article.

2. The sublimation heat transfer system of claim 1, wherein said actuator comprises a cam extending around said carousel for contacting and extending said plunger for engaging the article and the transfer sheet against said fixture to provide pressure of the transfer sheet against the article substantially throughout the transfer portion of the endless path.

3. The sublimation heat transfer system of claim 2, wherein said plunger includes a support spindle carrying a self-aligning cam follower to prevent binding throughout said endless path.

4. The sublimation heat transfer system of claim 3, wherein said self-aligning cam follower includes a follower wheel on an angled carrier pivotally attached to said spindle and extending rearwardly with respect to the movement of the spindle on the carousel.

5. The sublimation heat transfer system of claim 1, wherein said fixture includes an insert for receiving the article and the transfer sheet, said insert serving to press the transfer sheet against the coating on the article upon extension of said plunger.

6. The sublimation heat transfer system of claim 5, wherein said fixture further includes a resilient backing to receive and cushion the article and the transfer sheet upon full extension of said plunger throughout the transfer portion of the endless path.

7. The sublimation heat transfer system of claim 6, wherein said fixture is formed of metal to form a heat sink and provide an even distribution of thermal energy to the article during movement along the transfer portion.

8. The sublimation heat transfer system of claim 1, further comprising an ejection pin associated with said fixture for removal of the article within the unloading portion of the endless path; and an actuator for extending said ejection pin.

9. The sublimation heat transfer system of claim 8, wherein said actuator comprises a cam for contacting and extending said pin for ejecting the article; and a spring acting counter to the ejection movement for retracting said pin following the ejection of the article.

10. The sublimation heat transfer system of claim 1, wherein said fixture includes an insert for pressing the transfer sheet against the coating on said article throughout the transfer portion of the endless path, said insert being tapered to assist in guiding the article and transfer sheet.

11. The sublimation heat transfer system of claim 10, wherein said insert is a low friction material; and wherein said fixture further includes a resilient backing between said fixture and said insert for cushioning the article and the transfer sheet upon full extension of said plunger throughout the transfer portion of the endless path.

12. The sublimation heat transfer system of claim 1, wherein said fixture includes a clamp fixture for receiving the article and the transfer sheet; and wherein said plunger engages said fixture for pressing the transfer sheet against the article along the transfer portion of the endless path.

13. The sublimation heat transfer system of claim 12, wherein said fixture is resilient and substantially C-shaped for receiving the article and the transfer sheet along the loading portion and releasing the article along the unloading portion of the endless path.

14. The sublimation heat transfer system of claim 12, wherein said fixture includes a low friction insert for receiving the article and the transfer sheet and for pressing the transfer sheet against the article throughout the transfer portion of the endless path; and wherein said fixture further includes a resilient backing between said fixture and said insert for cushioning the article and the transfer sheet upon full extension of said plunger.

15. The sublimation heat transfer system of claim 1, wherein is provided a plurality of plungers and corresponding fixtures attached around said carousel to receive multiple articles and transfer sheets;

said heater including an oven enclosing said carousel, whereby patterns are transferred to the multiple articles in a continuous fashion at one time.

16. A method of transferring a pattern of sublimating ink from a transfer sheet to a coating on an article moving around a carousel of a sublimation heat transfer system comprising:

positioning at least one fixture for receiving the article and the transfer sheet on the carousel;

driving said carousel in an endless path loading/unloading portions and a transfer portion;

receiving said article and said transfer sheet in said fixture;

extending at least one plunger on said carousel for engaging the article and the transfer sheet within said fixture substantially throughout the transfer portion of the endless path;

activating said coating and ink by heat applied during movement along said path through said transfer portion; and retracting said plunger for unloading following the transfer portion of the endless path, whereby said heat transfer system operates in an endless fashion on a carousel with the attached fixture and plunger moving along said path so as to enhance the transfer of the pattern into a sharp image on the article.

17. The method of transferring a pattern from a transfer sheet to a coating on an article of claim 16, wherein said at least one plunger carries a cam follower; and wherein extending said at least one plunger includes contacting said cam follower with a cam.

18. The method of transferring a pattern from a transfer sheet to a coating on an article of claim 16 further comprising receiving the article and the transfer sheet within an insert of said fixture; and pressing the transfer sheet against the article within said insert upon full extension of said plunger substantially throughout the transfer portion of the endless path.

19. The method of transferring a pattern from a transfer sheet to a coating on an article of claim 18 further comprising cushioning the article and the transfer sheet in said insert and maintaining the cushion throughout the transfer portion of the endless path.

20. The method of transferring a pattern from a transfer sheet to a coating on an article of claim 16 wherein said receiving includes placing the article and the transfer sheet on said at least one plunger within the loading portion of the endless path.

21. The method of transferring a pattern from a transfer sheet to a coating on an article of claim 16 wherein a plurality of fixtures and corresponding plungers are positioned on the carousel for receiving multiple articles;

repeating the loading and unloading steps in sequence, whereby patterns are transferred to the multiple articles in a continuous fashion.

* * * * *